(12) United States Patent
Chevallier et al.

(10) Patent No.: US 7,676,825 B2
(45) Date of Patent: Mar. 9, 2010

(54) METHOD FOR TRANSMITTING AUDI-VISUAL PROGRAMS PROPOSED BY USERS, TERMINAL AND SERVER

(75) Inventors: Louis Chevallier, La Meziere (FR); Michel Cosmao, Liffre (FR); Jean-Ronan Vigouroux, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 946 days.

(21) Appl. No.: 10/485,408

(22) PCT Filed: May 31, 2002

(86) PCT No.: PCT/FR02/01826

§ 371 (c)(1),
(2), (4) Date: Sep. 2, 2004

(87) PCT Pub. No.: WO03/013139

PCT Pub. Date: Feb. 13, 2003

(65) Prior Publication Data

US 2005/0004994 A1    Jan. 6, 2005

(30) Foreign Application Priority Data

Jul. 31, 2001    (FR) .................................. 01 10264

(51) Int. Cl.
*H04N 7/173*    (2006.01)
(52) U.S. Cl. ................... 725/86; 725/5; 725/8; 725/97; 725/104
(58) Field of Classification Search .................... 725/5, 725/8, 86–104
See application file for complete search history.

(56) References Cited

U.S. PATENT DOCUMENTS 5,604,528 A * 2/1997 Edwards et al. ............... 725/25

(Continued)

FOREIGN PATENT DOCUMENTS

| EP | 0 912 061 | 4/1999 |
|---|---|---|
| WO | 99/60790 | 11/1999 |
| WO | WO99/60790 | 11/1999 |

(Continued)

OTHER PUBLICATIONS

Translation of International Preliminary Examination Report, p. 3, 1. Base du rapport-all No. 1 and all No. 4 and pp. 4 and 5.

*Primary Examiner*—Christopher Kelley
*Assistant Examiner*—Charles N Hicks
(74) *Attorney, Agent, or Firm*—Robert D. Shedd; Harvey D. Fried; Joel M. Fogelson

(57) ABSTRACT

The present invention concerns a method of receiving audio-visual programs transmitted to terminals. The users of the terminals choose a program from a catalogue and make a proposition to a server to download it to their terminals. The proposition is accompanied by a price and/or deadline. The server analyzes the propositions it receives and, taking account of its profitability constraints, decides whether or not it will transmit the program. Depending on the case, it sends the acceptance to each user who has made a proposition with profitable parameters for the transmission of the program and gives the users the means of receiving the program for viewing. The decision to transmit the program is determined according to various strategies the common criterion of which is profitability. The invention also concerns a terminal and a server for the implementation of the method.

24 Claims, 4 Drawing Sheets

U.S. PATENT DOCUMENTS

| | | |
|---|---|---|
| 5,794,207 A | 8/1998 | Walker et al. |
| 6,285,987 B1* | 9/2001 | Roth et al. ............... 705/27 |
| 6,321,383 B1* | 11/2001 | Funahashi et al. ........... 725/92 |
| 6,330,603 B1 | 12/2001 | Seki et al. |
| 2002/0129375 A1* | 9/2002 | Kim et al. ............... 725/100 |
| 2003/0005454 A1* | 1/2003 | Rodriguez et al. ........... 725/89 |
| 2006/0271973 A1* | 11/2006 | Jerding et al. ............ 725/86 |
| 2006/0271976 A1* | 11/2006 | Yurt et al. ............... 725/87 |
| 2007/0186253 A2* | 8/2007 | Hunter .................. 725/87 |

FOREIGN PATENT DOCUMENTS

| | | |
|---|---|---|
| WO | WO00/49546 | 8/2000 |
| WO | 01/01317 | 1/2001 |

\* cited by examiner

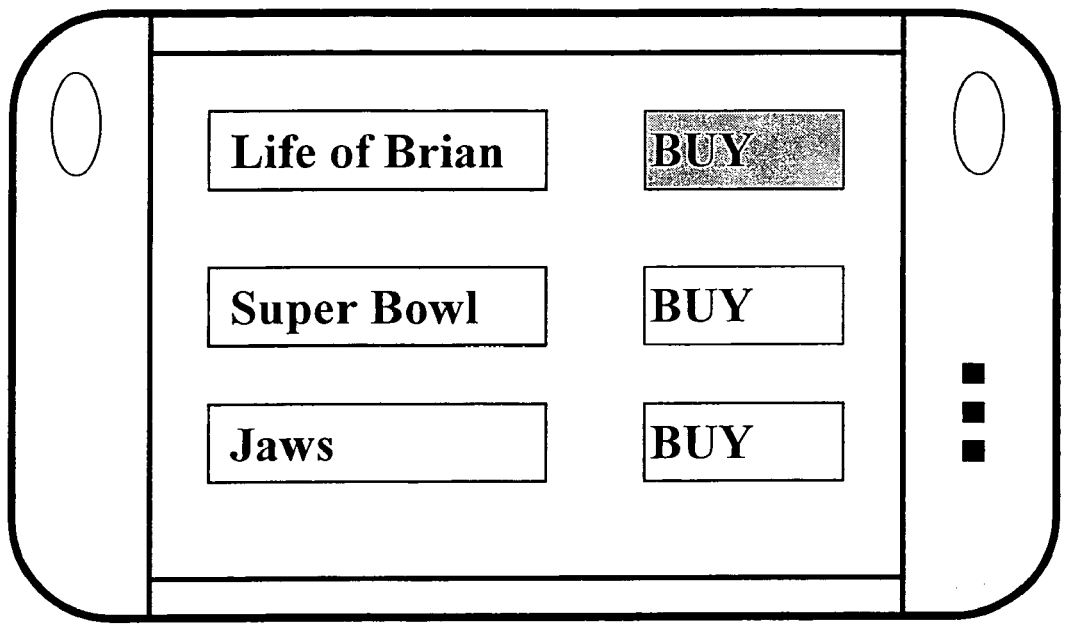
Fig. 4.a
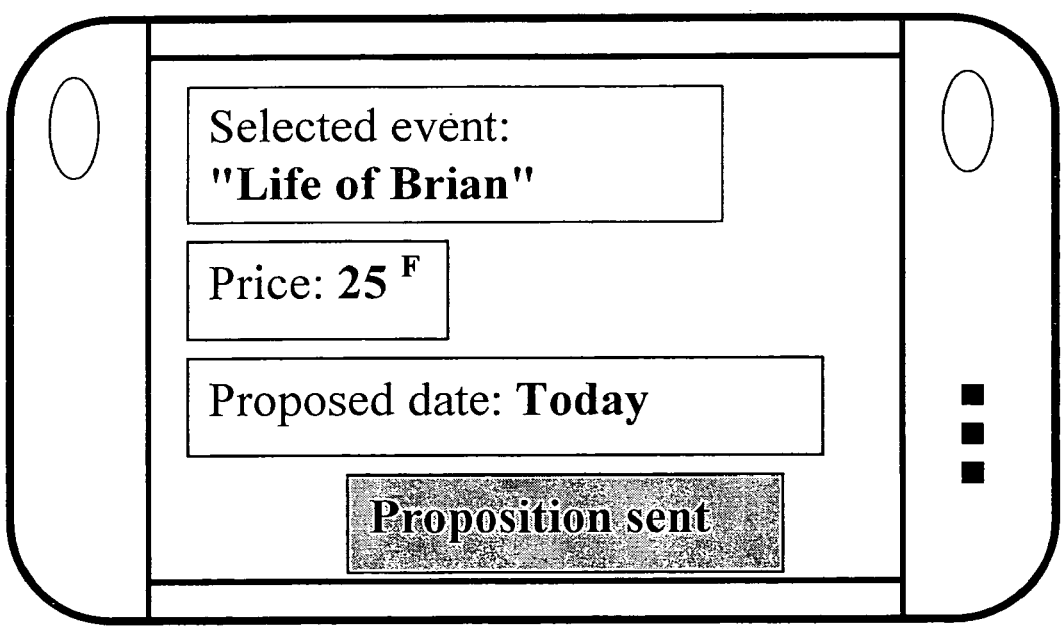
Fig 4.b

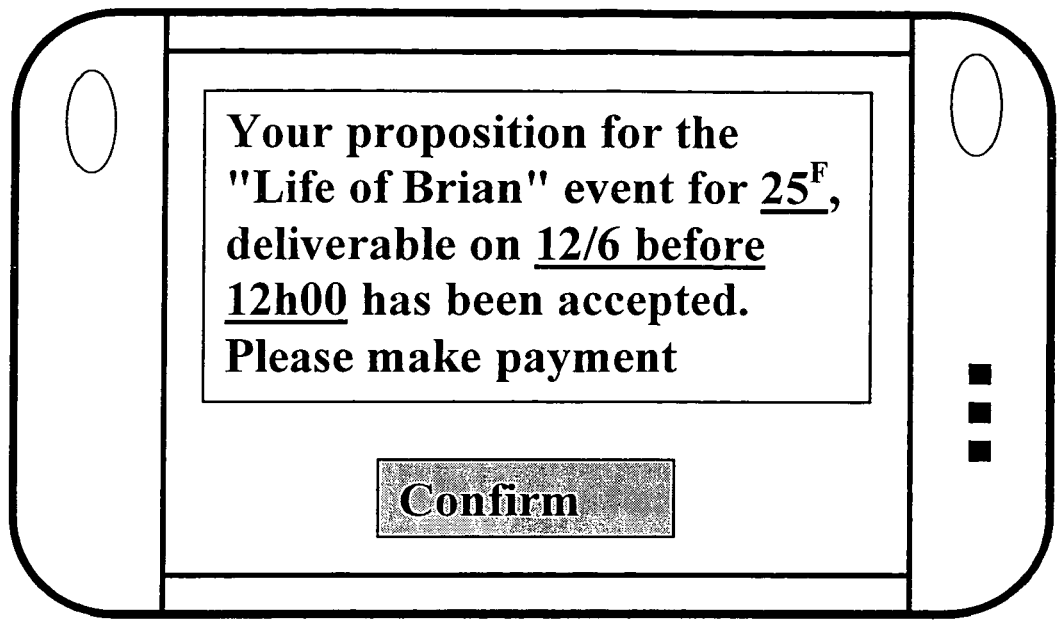
Fig 4.c
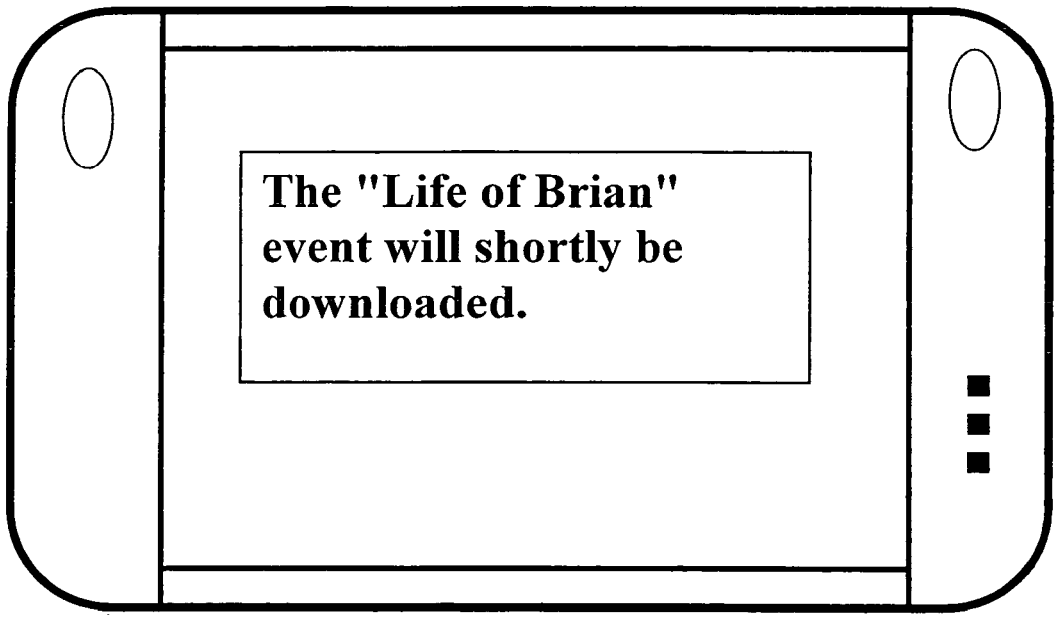
Fig 4.d

METHOD FOR TRANSMITTING AUDI-VISUAL PROGRAMS PROPOSED BY USERS, TERMINAL AND SERVER

This application claims the benefit under 35 U.S.C. §365 of International Application PCT/FR02/01826 filed May 31, 2002, which claims the benefit of French Patent Application No. 01/10264 filed Jul. 31, 2001.

FIELD OF THE INVENTION

The invention concerns a method of transmitting audiovisual programmes in at least one terminal linked to a network as well as a terminal implementing the method and a server for transmitting the programmes to the terminals. The invention applies more particularly when the reception of the audiovisual programmes is conditional upon a payment.

BACKGROUND OF THE INVENTION

The context of the present invention is that of audiovisual servers capable of supplying audiovisual programmes on demand, and of any domestic device capable of displaying audiovisual programmes received from a terrestrial, microwave or satellite network and communicating with a server with the aid of a broadcast network. The audiovisual programme is typically transmitted over a one-way broadcast network. Access to the audiovisual programmes is usually conditional upon a payment by the user of the device. Electronic Program Guides (EPG for short) offer users a catalogue of audiovisual programmes, and particularly films. The user chooses a programme from this catalogue and after paying for the access rights, he receives the means of viewing it in clear. The programme is transmitted in encrypted form over the broadcast network and the receiver decrypts the programme by means of a previously received code. Another way of operating consists in setting up a call with the server supplying the programmes, interrogating its catalogue, and downloading the programme after a payment. The price, which is fixed by the programme supplier, is usually displayed by the EPG, so that the user knows the cost of the operation before committing himself.

Certain devices have a hard disk or some other means of storing programmes (cassette, cartridge, DVD-RAM, etc.). A programme can then be downloaded over the network directly to the hard disk, in compressed form, irrespective of the display constraints. The programme can then be downloaded at any moment, without the user's intervention, and at a time that does not disturb him, at night for example. The programme is stored as it is received. During viewing, the device reads the programme from the storage means, decompresses it and sends the audiovisual signals to a screen.

In fact the profitability of a download fluctuates considerably depending on the circumstances. One of the aims of the present invention is to be able to optimise the profitability of such downloads.

SUMMARY OF THE INVENTION

For this purpose, the invention concerns a method of transmitting audiovisual programmes from a server to at least one terminal comprising a first step of viewing a catalogue of downloadable audiovisual programmes on the terminal, characterized in that it comprises the following chronological steps:

at the terminal:
a step of selecting at least one audiovisual programme;
a step of generating a proposition conditioning the reception of the selected programme;
a step of transmitting the proposition to the server, the proposition comprising at least one of the following parameters: deadline, price;
and at the server:
a step of analysing the propositions sent by the terminals and of determining a decision to transmit the programme taking account of the parameters;
if the decision to transmit the programme is taken:
a step of transmitting the selected programme,
a step of transmitting a code enabling each terminal that has sent a proposition to view the received programme, viewing occurring after payment of a minimum price and/or not later than expiry of the determined deadline.

In this way, the present solution means that the server does not have to propose at a low price a programme which, downloaded to a restricted population of users, will not be profitable for the server. Contrary to prior art which discloses a fixed programme price, the price in the invention can be fixed by the users according to their interests and validated by the server according to the profitability.

As an improvement, the analysis step is activated after a determined time from the moment when the programme is placed in the catalogue. As a variant, the analysis step is activated after a determined number of propositions have been received.

As an improvement, the server sends to the terminals a notification indicating after the analysis step that it has decided not to transmit the programme. This notification may include an indication of the reason for the server's refusal to transmit the programme. This notification may also include a parameter value which, incorporated in a proposition, would enable the user to view the programme.

As another improvement, the proposition transmitted by a terminal includes an indication determining a subset of programmes from the catalogue, for example a precise topic. The server then selects from the subset a programme the transmission of which complies with the server's own criteria. As another improvement, the decision to transmit a programme is preferably taken when many users have proposed that programme. In this way, the present invention enables the server to download programmes only to a number of users known in advance and to defer the download or remove that programme from the catalogue if this number is too low.

As a final improvement, the method comprises a step of recording the programme that one wishes to receive under certain conditions on the terminals.

The present invention also concerns an audiovisual terminal comprising a central processor unit, a means of receiving audiovisual programmes, a means of two-way communication with a network, a means of displaying a catalogue of available programmes and a means of selecting an audiovisual programme, characterized in that it also comprises a means of generating at least one parameter such as the price and/or deadline, associated with the downloading of at least one selected programme, a first means of transmitting to the network a proposition comprising at least one programme identifier and the parameter entered, and a means of receiving an agreement to download the programme according to the previously generated parameter.

The present invention also concerns a server comprising a database containing audiovisual programmes, the server having a communication interface for establishing a link with a plurality of terminals, characterized in that it comprises a means of receiving propositions for transmitting at least one programme contained in the database, the said propositions coming from at least one terminal comprising at least one parameter such as a price or a deadline relating to the transmission of the programme from the server to the terminals, a means of analysing the propositions received, a means of determining a decision to transmit the programme taking account of the parameters transmitted; and a means of transmitting to the terminal a code for viewing at least one selected programme.

BRIEF DESCRIPTION OF THE DRAWINGS

The present invention will now appear in greater detail in the context of the description that follows of exemplary embodiments given for illustrative purposes with reference to the appended figures amongst which:

FIGS. 4a, 4b, 4c and 4d represent what appears on the screen for an implementation of the invention.

DETAILED DESCRIPTION OF THE INVENTION

Figure 1:
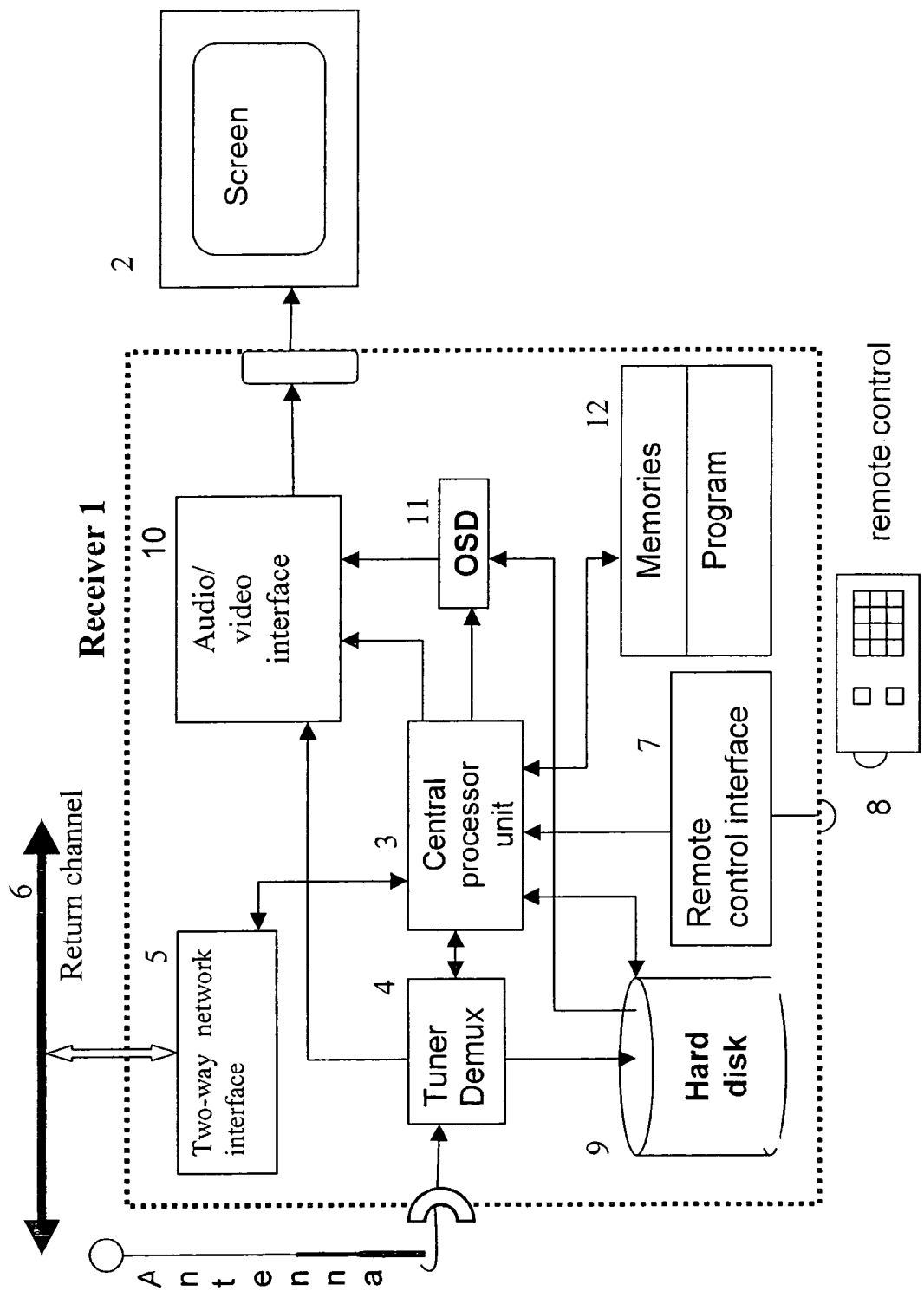
FIG. 1 is a block diagram of an audiovisual receiver for an implementation of the invention.

We will first describe with the aid of FIG. 1 the operation of an audiovisual receiver 1 provided with a display device 2. The receiver comprises a central processor unit 3 linked to a program (ROM) and work (RAM) memory 12, and an interface 5 for a two-way communication with a network 6. This interface is also called a return channel. This network is for example an IEEE 1394 network. The receiver may also receive audio/video data from a broadcast network via a receive antenna associated with a demodulator 4. The antenna may also be replaced by a physical connection to any type of high bit rate local digital bus for transmitting audio/video data in real time, such as a cable access point or a DSL connection. The receiver also comprises an infrared signal receiver 7 to receive the signals from a remote control 8, a means of storage 9 for the storage of audiovisual programmes and an audio/video decoding logic system 10 to generate the audiovisual signals sent to the television screen 2. The nature of the audiovisual programmes being digital, the means of storage 9 is preferably a hard disk (HDD), it may also be a recordable optical disk drive (DVD-RAM).

The remote control 8 has direction buttons ↑, ↓, → and ← and "OK", "Buy" and "Send" buttons the use of which will be revealed later in the description. The receiver also has a clock (not shown) to wake up the receiver when a programme to be recorded is on the point of being downloaded.

The receiver also comprises a circuit 11 for displaying data on the screen, often called an OSD circuit, "On Screen Display". The OSD circuit 11 is a text and graphics generator which is used to display on-screen menus, pictograms (for example a number corresponding to the channel displayed) or which is used to mix two audiovisual contents. The OSD circuit is controlled by the central processor unit 3 and a program called a "Loader" which is resident in the memory 12. The Loader typically consists of a program module written in read only memory and of parameters saved in work memory. The Loader may also be implemented in the form of a specific circuit of the ASIC type for example. This circuit may have security functions for making a payment following a user's decision to view a pay-per-view programme.

The receiver receives audiovisual programme identification data from the return channel 6 or the broadcast network. This data comprises viewable elements, the title for example or an image of the preview trailer. With the aid of an EPG and the buttons on his remote control, the user selects one or more programmes with a view to receiving them and recording them on the hard disk 9.

Figure 2:
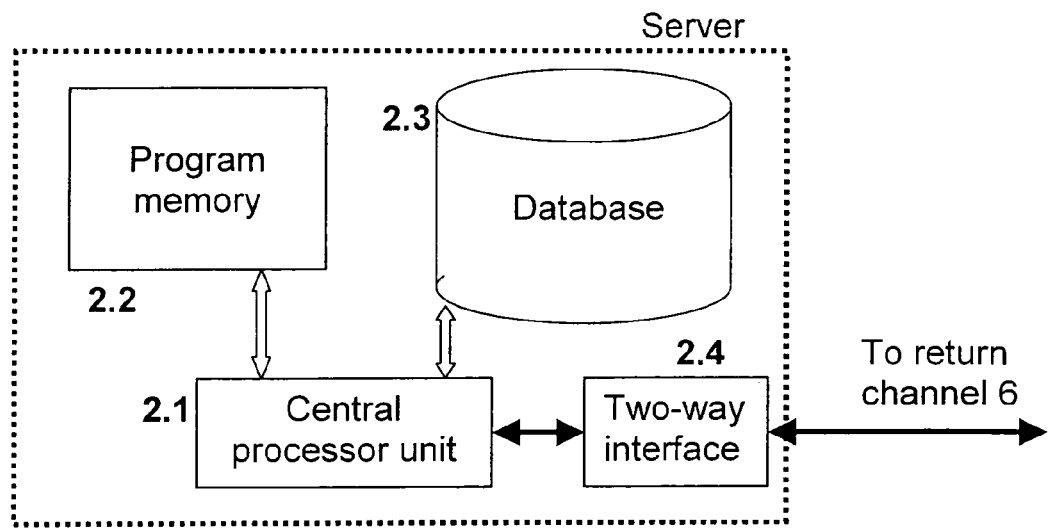
FIG. 2 is a diagram showing the different elements of a server according to the principles of the invention.

The server described in FIG. 2 comprises a central processor unit 2.1, a program memory 2.2, a memory containing a database 2.3 preferably implemented by a hard disk and a communication interface providing a two-way link 2.4 over the two-way network 6 with the previously described receivers. The database 2.3 mainly contains the catalogue of available programmes. The server is also in contact with the broadcast network manager via an interface (not shown). It sends to this manager mainly instructions to broadcast programmes at determined dates and times.

After having described the different elements of the invention we will now explain how they cooperate.

Figure 3:
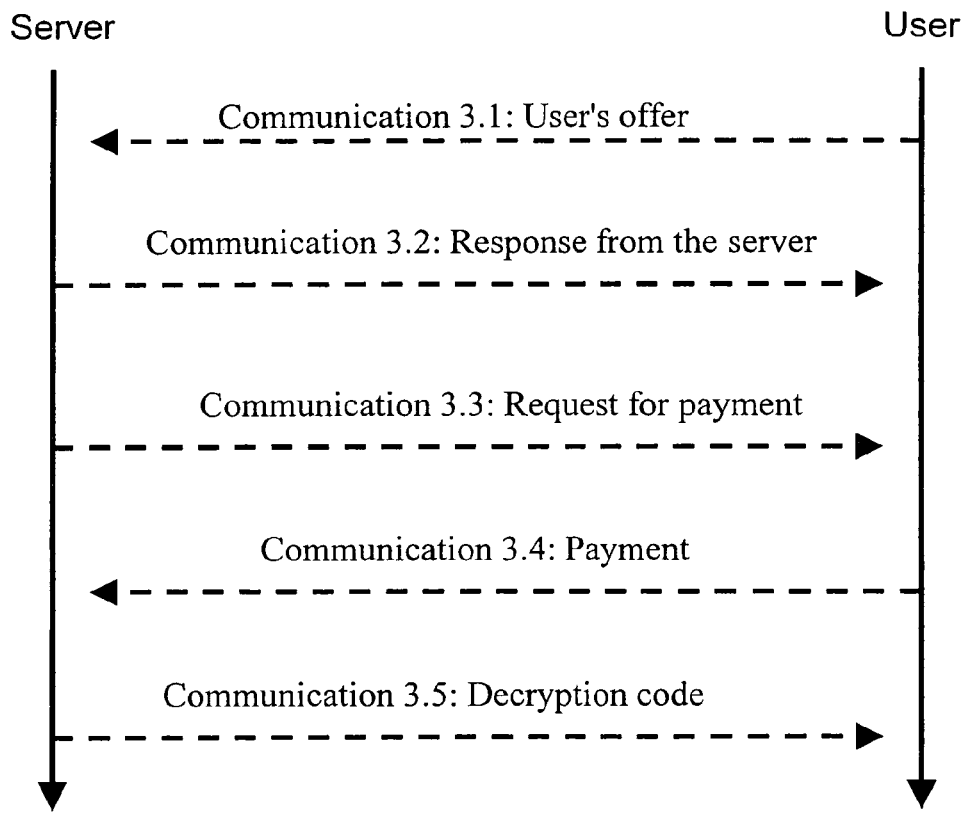
FIG. 3 illustrates a illustrative embodiment of the present invention for communications between a user and the server.

The different communications between the user and the server are illustrated in FIG. 3. First the user starts the Loader program which initially downloads from the broadcast network the catalogue of available programmes. A variant consists in logging on to the server over the network 6 and in downloading the catalogue. The catalogue managed by the server contains a list of programmes proposed to the users, these programmes being identified by a title or an image of its preview trailer.

The catalogue is then displayed on the screen 2 so that the user can select at least one programme. Taking account of his availability and budget, the user determines parameters with the ultimate aim of viewing that programme on his receiver: a price and a latest date for making the programme available to him. Then, during a first communication (communication 3.1), the user sends the server the triplet formed of the following elements:

identifier of the programme tagged in the EPG, the latest date for receiving the programme, the proposed price.

The server records all the propositions and, following an analysis step, determines the server parameters beyond which the broadcast becomes profitable for the server. These parameters are calculated according to the duration of broadcast of the programme, which, because of this, occupies the network for a determined time, and according to the time of broadcast. For example, transmission at night costs less than during the day. After the proposition analysis step for a given programme, the server compares the parameters of each proposition with those previously calculated. If the price proposed by the user is equal to or greater than that determined by the server AND if the latest date proposed by the user is equal to or later than that predicted by the server, THEN the server accepts the proposition from that user and notifies him of its agreement in a communication (communication 3.2). The server also sends the user a payment request (communication 3.3). It is important to note that the server does not transmit its parameters, so the users cannot know them and are obliged to propose a considerable sum to be sure that the server has an interest in instructing the broadcast of that programme so that the user can receive it.

The user receives the notification that his proposition has been accepted and that the server requires him to pay for the programme. He then makes the payment according to known techniques, using for example prepaid tokens or a bank type smart card inserted into his receiver. The payment parameters are sent to the server (communication 3.4). The server checks that the payment parameters are authentic and, if they are, sends a particular code to the receiver (communication 3.5) which will enable it to decrypt the programme when it is received. In a possible variant, the user does not make the payment directly but commits to pay for the received programme against an invoice which will be presented to him later. This invoice may include the user's different uses of the service during a given period, and even of other services, such as a subscription to a cable access supplier or to a satellite television operator.

The programme may be made available to the user in different ways. A first way consists in recording the programme in encrypted form in each receiver that has sent a proposition. Then, if the proposition is accepted and if the payment is made, a code used for decryption is transmitted to the receiver. In this way, payment can be made independent of reception. A variant consists in first transmitting to the receiver the acceptance of the proposition and, if the payment is made, the decryption code. Then, the programme is transmitted in encrypted form, decrypted on receipt and recorded in clear in the receiver's memory. This other method has the advantage of avoiding decryption every time the recorded programme is viewed.

The Loader displays menus by which the user can enter his parameters and start the communications between the server and the receiver. The first menu illustrated in FIG. 4.a is for presenting the catalogue of programmes proposed by the server. In the example, three programmes are available: "Life of Brian", "Super Bowl" and "Jaws". Icons marked "BUY" are placed beside the titles. The user selects the icon corresponding to the programme he wishes to receive. A variant consists in using a special "Buy" button on the remote control 8. The menu illustrated in FIG. 4.b appears. This menu lets the user enter the parameters of his proposition. In a window, the user enters the price he wants to pay on the buttons of the digital keypad of his remote control 8, in the example: 25F. In another window, the user enters the latest date and time for receiving that programme, "12h00", at the price he has set. Then, the user confirms his proposition by pressing the "Send" button. The proposition consisting of an identifier of the selected programme and the parameters the user has entered is then sent to the server.

The server receives the proposition over the network 6 and records it in its database 2.3 with the other propositions relating to the same programme. At the end of a certain time after the programme is placed in the catalogue (six hours for example), the server initiates the step of analysing the propositions received. It first determines the set of propositions that have not lapsed, that is which concern programmes that may still be transmitted within the deadline proposed by the users. The server then calculates the total price of the propositions of that set and the transmission deadlines imposed by the users. According to a strategy that is described later, the server decides whether or not to program the programme broadcast. If the server cancels the broadcast because it is not profitable, it notifies its refusal in a communication, indicating the programme's identifier. This notification can be made either over the broadcast network or over the return channel. If the notification is made over the broadcast network, each receiver verifies whether it has previously sent a proposition for that programme and, if it has, informs the user via a message on the screen 2 that he will not receive the programme corresponding to his proposition.

If the server programs the broadcast of the programme considering it to be profitable, it then repeats the communication with each user. For this, it sends a message to all the receivers that have sent a proposition, indicating agreement, the programme's identifier, the parameters proposed by each user, and the date of availability of that programme. The receiver then displays the menu illustrated in FIG. 4.c indicating the time of download of the programme. The server then requests payment. The user confirms by pressing the "OK" button which has the effect of initiating the transaction for the sum of 25F according to the previous example. The server receives the payment certificate and returns to the user the acknowledgement of receipt which is displayed in the form of the menu illustrated in FIG. 4.d. The sentence "The "Life of Brian" programme will be delivered" is displayed. Acceptance of the proposition sent to the user is transmitted no later than immediately before the download of the programme.

The step for analysing the propositions is initiated in a simple manner a determined time from the moment when the programme is proposed in the catalogue. A variant consists in counting the propositions for a given programme and in initiating the analysis step when a certain number of propositions have been received. If, after a maximum deadline set at the beginning by the server, the minimum number of propositions has not been reached, the server does not instruct its broadcast.

Naturally, if other propositions arrive after the analysis step and before the broadcast, and if they are compatible with the price and deadline parameters calculated by the server, they are accepted and the programme is downloaded to the users who have requested it.

An improvement of the invention consists in the server indicating at least one reason for refusal of the propositions. For example, a proposition for a programme of very long duration while requesting a short deadline cannot be accepted for material reasons of bandwidth occupancy of the broadcast network. Whatever price is proposed, the proposition cannot be satisfied. The server does not wait for the end of the proposition analysis step and responds immediately to the user in the negative indicating the reason for the refusal. This improvement enables the user to reformulate his proposition taking account of the reason for the refusal, in this case by indicating another deadline and sending it to the server. This new proposition has more chance of being accepted.

An improvement consists in the user not defining precisely the programme he wants to receive but one or more of the criteria transmitted in signalling tables (for example a table described in the DVB-SI standard). These tables contain attributes characteristic of audiovisual programmes. The criteria define subsets of programmes that have a criterion in common. For example, the user may define one or more topics and/or sub-topics of programmes, such as: Nature: film and topic: science fiction, or "documentary" and "wildlife". The user may also use the name of an actor or that of a producer. For example, he may ask the server for a "western" with "John Wayne". In return the server chooses a programme, which corresponds to the criteria or for which the analysis step has culminated in an acceptance of broadcast, and then it proposes it to the user.

We will now explain how the server determines which programmes to download and in what order.

Suppose that the server proposes m programmes Ei (i=1 to m) in its catalogue. We have previously said that the server records all the propositions from the users in its database 2.3. At a certain moment, it analyses all the propositions and calculates parameters beyond which the programme broadcast is profitable. For a given programme "Ei", the amount of money the propositions would generate for it if they were satisfied varies according to the deadline for transmitting that programme. This is for two reasons: on the one hand the longer the server waits, the fewer users it satisfies. On the other hand, the users who want to receive the programme quickly are likely to make a better offer, whereas those who are not in a hurry to receive it propose a lower price. The present invention enables the server to program the broadcast of the programme according to the price that that broadcast will generate for it.

The server constantly updates an array indicating, for each programme and for the subsequent eight time bands, the number of users and the amount of money that the users are proposing to receive the programme. When a programme is transmitted, it disappears from the array. But it may reappear if it is not removed from the catalogue because users may continue to request it. Certain programmes are very popular and may be transmitted a set number of times, so they must not be removed from the catalogue after the first broadcast. To simplify, the array below contains only four programmes.

TABLE I

| Broadcast: | Transmission duration | 1st hour | 2nd hour | 3rd hour | 4th hour | 5th hour | 6th hour | 7th hour | 8th hour |
|---|---|---|---|---|---|---|---|---|---|
| E1 | 58 min | 23/ 412$^F$ | 65/ 925$^F$ | 89/ 1230$^F$ | 85/ 1050$^F$ | 45/ 602$^F$ | 23/ 245$^F$ | 9/ 98$^F$ | 5/ 65$^F$ |
| E2 | 131 min | 51/ 982$^F$ | 95/ 1756$^F$ | 88/ 1622$^F$ | 81/ 1460$^F$ | 61/ 801$^F$ | 52/ 560$^F$ | 40/ 456$^F$ | 26/ 287$^F$ |
| E5 | 28 min | 23/ 321$^F$ | 24/ 322$^F$ | 26/ 331$^F$ | 29/ 348$^F$ | 25/ 305$^F$ | 12/ 185$^F$ | 12/ 160$^F$ | 5/ 64$^F$ |
| E9 | 90 min | 45/ 765$^F$ | 32/ 612$^F$ | 25/ 498$^F$ | 19/ 358$^F$ | 18/ 321$^F$ | 15/ 301$^F$ | 12/ 205$^F$ | 16/ 198$^F$ |

Table I (the figures are given as an example, the prices are the totals of the propositions).

A first strategy consists in the server taking account of the immediate propositions, that is within the hour. The proposition analysis step is in this case reduced to an hour. This strategy is justified because it makes it possible to satisfy all the users who have requested a programme irrespective of the proposed deadline. After a time band, the server erases from the array the data concerning the programmes transmitted (unless it has been agreed to transmit it several times), and analyses the next time band. The server then determines which programmes are to be downloaded during that time band. The array is continually updated in line with the propositions, if a proposition arrives but does not concern a programme listed in the catalogue, the server sends a refusal notification to the user. Indeed, as soon as a programme is in the catalogue, it is automatically listed in the array.

For each programme, the server adds together the amounts of money corresponding to each time band and chooses the programmes that generate the most. From the numerical values given in the above array, we can see that downloading the programmes would generate:

For programme E1: 4627 F
For programme E2: 7924 F
For programme E5: 2036 F
For programme E9: 3258F According to the first strategy, the server gives priority to transmitting the programmes which generate the most for it: first E2, then E1, then E9 and E5.

This first strategy is appropriate when the server receives few propositions and if the catalogue contains a restricted number of programmes. But, if many choices are offered to the users, the server will probably receive propositions for each programme. It must therefore make a selection. At the end of each time band, it determines the programmes which are the most profitable to download. To determine the profitability of downloading a programme, the server can take account of the duration of its broadcast. For that, it calculates for each broadcast the revenue per unit of time (a minute for example) of its transmission:

For programme E1: 4627 F/58=80 F/min
For programme E2: 7924 F/131=60 F/min
For programme E5: 2036 F/28=73 F/min
For programme E9: 3258F/90=36 F/min Suppose for example that the bandwidth of the broadcast network allows the downloading of only approximately three hours of audiovisual programmes per time band. It is therefore important to optimise this time band and to download the most profitable programmes first. In the present case, programmes E1 and E5 are the most profitable and will be run before programme E2. There then remain 180−(58+28)=94 minutes of transmission, which is insufficient to broadcast programme E2. Because of its duration, the broadcast of E2 will occur over two time bands. So the propositions to receive E2 within at least two hours will be satisfied, but not those to receive in the hour. The broadcast of E2 will therefore not satisfy all the propositions. The 131−94=37 remaining minutes to transmit E1 will be taken in the next time window. To the users for whom the proposed deadline is not satisfied, the server sends a message indicating the predicted time of downloading and a price lower than the one initially proposed. These users are then free to accept or reject the new offer made to them by the server.

Another strategy (which may also be used to choose between two equivalent options in terms of profitability) consists in choosing the programmes that satisfy the maximum of users. The server will then choose programme E9 which can be broadcasted within the remaining time span of 94 minutes, rather than programme E1. So the server can satisfy all the users that have requested E1, E5 and E9.

It should be noted that the user is not sure, when he makes a download proposition, of obtaining what he wants. After the analysis step, the server determines the groups of propositions that are the most valuable and chooses the most advantageous ones. Certain propositions will then be refused.

An improvement consists in that the downloads are carried out on several channels. Certain channels with higher bit rates will be used for short deadline downloads. Other channels are used for programmes with a low financial return. The means of communication may be different, the server may use microwave or satellite channels.

Another improvement consists in the server taking account of the evolution of the deadlines proposed by the users. When analysing the evolution of the propositions versus proposed deadline: 1 hour, 2 hours, 3 hours, etc., we see that as a general rule the number of propositions increases and then decreases after a certain deadline known as the "extremum". If the server delays the transmission of a programme by one or more time bands, the number of unsatisfied propositions remains low compared with the total number of propositions. If the extremum is in the first time band, the transmission delay for that programme means that a large number of propositions are not satisfied. Determining the position of the extremum in the time bands is therefore an important factor in defining the next downloads.

For example, by analysing the numerical values in the above array, we see that the maxima of the propositions occur in the following time bands:

For programme E1: 3 hours
For programme E2: 2 hours
For programme E5: 4 hours
For programme E9: 1 hour In the present case, if the server must make a selection while favouring this strategy, it will download as a priority E9 for which the extremum occurs during the first time band, then E2 (second time band), then E1 (third time band) and finally E5 (fourth time band). This strategy minimizes the loss of revenue due to unsatisfied propositions.

A improvement of the present invention consists in the user sending an incomplete proposition, in which a parameter is missing. For example he sends a price without any deadline or vice versa. The server receives his proposition and, because of the schedule of downloads, proposes in return a value of the missing parameter to satisfy the user. For example, the user sends a proposition indicating a programme and a price but without indicating the deadline. After the analysis step, the server replies, indicating the predicted deadline taking account of the parameters calculated at the end of the analysis step. If many propositions have been received and confirmed, the deadline will be short because the rapid download of such a programme is profitable. However, if few propositions have arrived, the deadline is long, or the server responds that it currently cannot program a download for that programme.

If several servers propose different catalogues, certain elements of the catalogues may be identical. Another improvement of the present invention consists in the loader launching the same proposition to several servers and after the various interchanges, transmits to the user the best offer, indicating which server could download the programme.

What is claimed is:

1. A method of transmitting audiovisual programs from a server to at least one terminal comprising a first step of viewing a catalogue of downloadable audiovisual programs on the terminal, comprising the following chronological steps:
   at the terminal:
      a step of selecting at least one audiovisual program;
      a step of generating a proposition conditioning the reception of the selected program, the proposition comprising a price whose value is determined and introduced by the terminal's user;
      a step of transmitting the proposition to the server containing the price introduced by the user;
   and at the server:
      a step of calculating a total price of the propositions for each audiovisual program sent by the terminals and of determining a decision to transmit the transmission taking account of the prices introduced in each terminal;
   if the decision to transmit the program is taken:
      a step of transmitting the selected program over a broadcast network,
      a step of transmitting a code enabling each terminal that has sent a proposition to view the received program, viewing occurring after payment of a minimum price.

2. The method of transmitting programs as claimed in claim 1, wherein at the server, the calculating step is activated after a determined time from the moment when the program is placed in the catalogue.

3. The method of transmitting programs as claimed in claim 1, wherein at the server, the calculating step is activated after a determined number of propositions is received.

4. The method of transmitting programs as claimed in claim 1, additionally comprising a step of transmission by the server to at least one terminal of a notification indicating that the server has decided not to transmit the program.

5. The method of transmitting programs as claimed in claim 4, wherein the said notification comprises an indication of the reason for the server's refusal to transmit the program.

6. Method of transmitting programs as claimed in claim 4, wherein the said notification comprises a parameter value such as the price or a deadline which, incorporated in a proposition, would enable the user to view the program.

7. The method of transmitting programs as claimed in claim 1, wherein the proposition sent by the terminal comprises an indication determining a subset of programs in the catalogue and in that, in the course of the calculation and determination step, the server selects from the subset a program from the catalogue the transmission of which to the terminals satisfies the server's own criteria.

8. The method of transmitting programs as claimed in claim 1, wherein the decision to transmit a program is taken preferably when many users have proposed that program.

9. The method of transmitting programs as claimed in claim 1, additionally comprising a step of recording the program within the terminal.

10. An audiovisual terminal comprising a central processor unit, a means of receiving audiovisual programs from a broadcast network, a means of two-way communication with a second network, a means of displaying a catalogue of available programs and a means of selecting an audiovisual program, comprising a means of introducing of a price whose value is determined and introduced by the terminal's user, the price being associated with the downloading of at least one selected program, a first means for transmitting to the second network a proposition comprising at least one program identifier and the introduced price, and a means of receiving a decision concerning the proposition, to download the program from the broadcast network according to the previously introduced price.

11. The audiovisual terminal as claimed in claim 10, additionally comprising a means of receiving a notification of refusal to download, the refusal being displayed on the display means.

12. The audiovisual terminal as claimed in claim 11, additionally comprising a means of receiving a second parameter such as the deadline incorporated in the notification of refusal to download, the second parameter being displayed on the display means.

13. The audiovisual terminal as claimed in claim 10, wherein only the price is incorporated in the proposition, the agreement to download received from the network is accompanied by a value of the deadline, and in that it comprises a second means of transmission over the network of a second proposition comprising the two parameters.

14. The audiovisual terminal as claimed in claim 10, wherein the proposition comprises an identifier (TOPIC) of a subset of programs presented in the catalogue, and in that it comprises a means of receiving an identifier of a program likely to be received according to the parameters defined in the proposition.

15. The audiovisual terminal as claimed in claim 10, additionally comprising a means of receiving a channel and network reference to receive the selected program.

16. The audiovisual terminal as claimed in claim 10, additionally comprising a means of storing the programs received.

17. A server comprising a database containing audiovisual programs, the server having a communication interface for establishing a link with a plurality of terminals, said server additionally comprising:
- a means of downloading to the terminals the catalog of available audiovisual programs without transmitting the price of each audiovisual programs;
- a means of receiving propositions to transmit at least one program contained in the database, said propositions coming from at least one terminal and comprising at least a price introduced by a user relating to the transmission of the program from the server to the terminals;
- a means of calculating the total price of the propositions received for each audiovisual program;
- a means of determining a decision to transmit the program taking account of the total price; and
- a means of transmitting to the terminal a code for viewing at least one selected program.

18. The server as claimed in claim 17, wherein the means of calculating and determining is activated after a determined time from the moment when the program is accessible to the users of the terminals.

19. The server as claimed in claim 17, wherein the means of calculating and determining is activated after receipt of a determined number of propositions from the terminals.

20. The server as claimed in claim 17, wherein a proposition received from a terminal comprises only one of the parameters from the set: price, deadline; and in that the acceptance sent to that terminal comprises a value of the other parameter in the set.

21. The server as claimed in claim 17, wherein a proposition received from a terminal comprises only one indication determining a subset of programs, the means of calculating and determining-also comprises a means of determining a program belonging to that subset, for which the parameters sent in the proposition enable a transmission to that terminal.

22. The server as claimed in claim 17, additionally comprising a means of determining the means of transmission of the program, the notification of acceptance of the transmission to the terminals comprising an identifier of the means of transmission.

23. A method for delivering an audiovisual program comprising the steps of:
- receiving a first proposition comprising a first price whose value is determined and introduced in a terminal's user and a first time of delivery for a program;
- receiving a second proposition comprising a second price whose value is determined and introduced in a terminal's user and a second time of delivery for said program;
- transmitting over a network by a server said program to a first user, corresponding to said first proposition, at a time before or equal to said first time of delivery if said first proposition is greater than or equal to a price parameter corresponding to said program and said first proposition is before or equal to a time of delivery parameter corresponding to said program; and
- rejecting said second proposition, corresponding to a second user, which results in said program not being transmitted to said second user, said second proposition is rejected because said second proposition is less than said price parameter or said second proposition is after said time of delivery parameter.

24. The method for delivering an audiovisual program, as claimed in claim 23, comprising the additional step of:
- transmitting a message to said second user indicating said second proposition is rejected, where said second user is offered the option of altering said second price and said second time of delivery for said program.

* * * * *